(12) United States Patent
Katsu et al.

(10) Patent No.: US 6,597,427 B1
(45) Date of Patent: Jul. 22, 2003

(54) LIQUID CRYSTAL PANEL, DISPLAY DEVICE, IDENTIFICATION MARK DETECTION DEVICE, DETECTION DISPLAY SYSTEM, TFT ARRAY REPAIR DEVICE AND IDENTIFICATION MARK DETECTION METHOD

(75) Inventors: Yoshihiro Katsu, Zama (JP); Hiroshi Yamashita, Fujisawa (JP); Yasuhiro Kimura, Yamato (JP); Satoshi Tsuji, Hadano (JP)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 09/608,111

(22) Filed: Jun. 30, 2000

(30) Foreign Application Priority Data

Jul. 6, 1999 (JP) ............................ 11-191894

(51) Int. Cl.⁷ ............................... G02F 1/13
(52) U.S. Cl. ......................... 349/192; 349/54
(58) Field of Search ............... 349/54, 55, 192; 324/770

(56) References Cited

U.S. PATENT DOCUMENTS

| | | | | |
|---|---|---|---|---|
| 4,343,877 A | * | 8/1982 | Chiang | 430/5 |
| 5,122,787 A | * | 6/1992 | Fujita et al. | 340/712 |
| 5,760,421 A | * | 6/1998 | Takahashi et al. | 257/59 |
| 5,774,107 A | * | 6/1998 | Inou | 345/104 |
| 5,977,563 A | * | 11/1999 | Kubo et al. | 257/72 |
| 6,028,650 A | * | 2/2000 | Kuroha et al. | 349/38 |
| 6,249,325 B1 | * | 6/2001 | Ohkawara et al. | 349/38 |
| 6,307,613 B1 | * | 10/2001 | Iida | 349/158 |

FOREIGN PATENT DOCUMENTS

| | | |
|---|---|---|
| JP | 2-302812 | 12/1990 |
| JP | 5-83927 | 11/1993 |
| JP | 7-104936 | 4/1995 |

* cited by examiner

*Primary Examiner*—Toan Ton
*Assistant Examiner*—Andrew Schechter
(74) *Attorney, Agent, or Firm*—Scully, Scott, Murphy & Presser; Robert M. Trep, Esq.

(57) ABSTRACT

In each pixel region 41 of a liquid crystal TFT array substrate, formed are an ITO transparent electrode 43, a gate line 48, a data line 46, a TFT active device 45, an identification mark 50 and the like. The identification mark 50 is provided by forming a bar code made of silver on the gate line 48. Since the identification mark 50 is formed within the pixel region 41, a transistor to be repaired can be surely identified, for example, by detecting the identification mark in a repair processing of the TFT array substrate. Furthermore, in an information processing apparatus for inputting figures and characters onto a screen using a laser pen, a locus of the laser pen can be accurately specified by specifying a position of a pixel region from an identification mark detected by the laser pen, and the figures and the characters input can be recognized minutely.

11 Claims, 9 Drawing Sheets

LIQUID CRYSTAL PANEL, DISPLAY DEVICE, IDENTIFICATION MARK DETECTION DEVICE, DETECTION DISPLAY SYSTEM, TFT ARRAY REPAIR DEVICE AND IDENTIFICATION MARK DETECTION METHOD

BACKGROUND OF THE INVENTION

1. Technical Field

The present invention relates to a display device, more particularly relates to a display device having an identification mark in its pixel region.

2. Prior Art

As a first prior art, a repair processing for a TFT array of a liquid crystal display panel will be described. When at least one of transistors as an active device on a TFT array is malfunctioning in manufacturing the liquid crystal display panel, conventionally the transistor is fused by a laser beam, and a repair processing is carried out to keep the malfunctioning transistor at a short-circuited state. In this repair processing, an electrical measurement is carried out as a pre-step, and a logic address of the malfunctioning transistor iscidentified. This electrical measurement is performed in such manner that all transistors on the TFT array are driven, and if any of them is malfunctioning, the malfunctioning transistor is detected and its logic address is output.

In a repair apparatus the TFT array is fixed onto an X-Y stage. The TFT array is composed of a plurality of pixel regions, which is composed of a display area which displays and a peripheral area provided around the display area, which does not display. In a corner portion in the edge portion of the TFT array, one "X" is provided as a symbol indicating a reference position. Based on the reference position and the logic address of the repair position, the X-Y stage is moved so as to fit a focus of the laser beam to the malfunctioning transistor. If the X-Y stage is moved to a position where a laser beam is allowed to be oscillated, a laser output apparatus emits the laser beam to perform the repair processing.

Next, as a second prior art, a key board apparatus using a touch panel will be described. FIG. 12 is illustrated based on the disclosure of Japanese Patent Laid-Open No. 5(1993)-83927, which shows a key board apparatus in which a transparent input touch panel is superposed on a flat display. In the flat display for displaying, a display area is divided into a plurality of segments, each of which is composed of a plurality of dots. The dot is the minimum unit for displaying. Each dot of the input touch panel is provided so as to correspond to the respective dots of the flat display panel for displaying. When either a dot or a segment on the touch panel is touched, an input is entered to either the dot or the segment.

An operation of the key board apparatus will be described with reference to FIG. 12. A user first touches an input touch panel 1201 within an area surrounded by a figure showing a star symbol, an input coordinate recognition section 1204 recognizes input coordinates entered. A conversion section 1206 converts the input coordinates to a segment. Moreover, the conversion section 1206 refers to a table 1207 for allowing an output code and the segment to correspond to each other, and outputs a code corresponding to the segment to a host computer 1209. Thus, the code corresponding to an enter key of the star symbol can be output to the host computer 1209.

Note that, as other prior arts, disclosures as to the touch panel were made in Japanese Patent Laid-Open No. 2(1990)-302813 and 7(1995)-104936.

As described above, in the conventional repair apparatus, a malfunctioning transistor has been located by specifying the logic address by the electrical measurement. However, although the logic address of the malfunctioning transistor is known, it has been extremely difficult to finally identify which transistor actually is malfunctioning. Even if a transistor to be repaired is shown by an optical microscope before a laser beam is emitted, the transistor to be repaired can be easily decided by a video from the optical microscope only when the transistor exhibits remarkable abnormalities in its planar structure. When the transistor exhibits micro defects within it, the decision has been impossible only by the video.

In the key board apparatus using the conventional touch panel, to specify a position on a flat display, a transparent input touch panel is superposed on the flat display, and a dot of the touch panel entered manually is made to correspond to a dot of the display, whereby the position on the display is indirectly specified. Accordingly, it was not always possible to specify the position finely and accurately.

SUMMARY OF THE INVENTION

The present invention was made to solve the above described problems, and the object of the present invention is to provide an apparatus and a method, which are capable of a processing concerning pixel regions of the display device effectively.

A liquid crystal display panel according to a first invention comprises a first glass substrate, a second glass substrate, a liquid crystal sealed between said first and second glass substrates, and a display electrode for applying an electric field to said liquid crystal, wherein a plurality of pixel regions are formed, and at least one of the pixel regions has an identification mark giving information.

In the liquid crystal display panel according to the first invention, a second invention is characterized in that each of said pixel regions is composed of an opening portion which allows light to pass therethrough and a light-shield portion other than said opening portion, and the identification mark is provided in the opening portion.

In the liquid crystal display panel according to the first invention, a third invention is characterized in that each of said pixel regions is composed of an opening portion which allows light to pass therethrough and a light-shield portion other than the opening portion, and the identification mark is formed in the light-shield portion.

In the liquid crystal display panel according to the third invention, a fourth invention is characterized in that a thin film transistor, a data line and a gate line are formed in the light-shield portion, and the identification mark is formed in one of the data line and the gate line.

In the liquid crystal display panel according to the second invention, a fifth invention is characterized in that a display electrode formed of a transparent electrode and a color filter are formed in the opening portion, and the identification mark is formed in one of the display electrode and the color filter.

A liquid crystal display panel according to a sixth invention comprises a first glass substrate, a second glass substrate, a liquid crystal sealed between said first and second glass substrates, and a display electrode for applying an electric field to said liquid crystal, wherein a plurality of pixel regions are formed, each of which has an identification mark giving specific information.

In the liquid crystal display panel according to the sixth invention, a seventh invention is characterized in that the identification mark gives information concerning a position of the pixel region in said liquid crystal display panel.

A display device according to an eighth invention, comprises: a plurality of pixel regions formed therein, wherein at least one of the pixel regions having an identification mark giving information.

In the display device according to the eighth invention, a ninth invention is characterized in that each of the pixel regions has an identification mark giving information.

In the display device according to the ninth invention, a tenth invention is characterized in that the identification mark gives information concerning a position of the pixel region in the liquid crystal display panel.

In the liquid crystal display panel according to the first, second third and sixth inventions, an eleventh invention is characterized in that the identification mark has a size in which the longest side is about 30 μm or less.

In the display device according to the eighth invention, a twelfth invention is characterized in that the identification mark has a size in which the longest side is about 30 μm or less.

An identification mark detection device according to a thirteenth invention detecting an identification mark provided in a display device having a plurality of pixel regions, which comprises identification mark reading-out means for reading out an identification mark formed at least one of the pixel regions; and position decision means for specifying a position of the pixel region on the display device based on the identification mark read out by the identification mark reading-out means.

A detection display system according to a fourteenth invention comprises a display device having a plurality of pixel regions formed therein; and an identification mark detection device detecting an identification mark provided in the display device, wherein the identification mark detection device comprises identification mark reading-out means for reading out an identification mark formed at least one of the pixel regions; and position decision means for specifying a position of the pixel region on the display device based on the identification mark read out by said identification mark reading-out means, and wherein the display device displays a pixel region at the position specified by the position decision means.

A TFT array repair device according to a fifteenth invention performs a repair processing for a TFT array of a liquid crystal panel in which a plurality of pixel regions are formed, which comprises identification mark reading-out means for reading out identification mark formed at least one of the pixel regions; position decision means for specifying a position of the pixel region on the display device based on the identification mark read out by the identification mark reading-out means; a stage on which said TFT array is mounted, the stage moving a position of said TFT array to move; a laser output device for performing a repair processing for a TFT formed in the pixel region by fusing the TFT; and a controller for controlling a movement of the stage and a laser output of the laser output device based on a specification result of the position specifying means.

An identification mark detection method according to a sixteenth invention, which detects an identification mark provided in a display device having a plurality of pixel regions formed therein, the method comprising: an identification mark reading-out step for reading out an identification mark formed at least one of the pixel regions; and a position specifying step for specifying a position of the pixel region based on the identification mark read out in the identification mark reading-out step.

In the identification mark detection method according to the sixteenth invention, a seventeenth invention is characterized in that the identification mark detection method further comprises: a pixel region displaying step for displaying the pixel region at the position specified in the position specifying step.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

Descriptions for an embodiment in which an identification mark is formed in a pixel region of a TFT (Thin-Film Transistor) array in a TFT liquid crystal module and the identification mark is detected will be made. Furthermore, as an example using this identification mark, a repair device for specifying a repair position of the TFT array in a repair process and an information processing device which accepts a screen input using a laser pen will be described.

TFT (Thin-Film Transistor) Liquid Crystal Module

Figure 1:
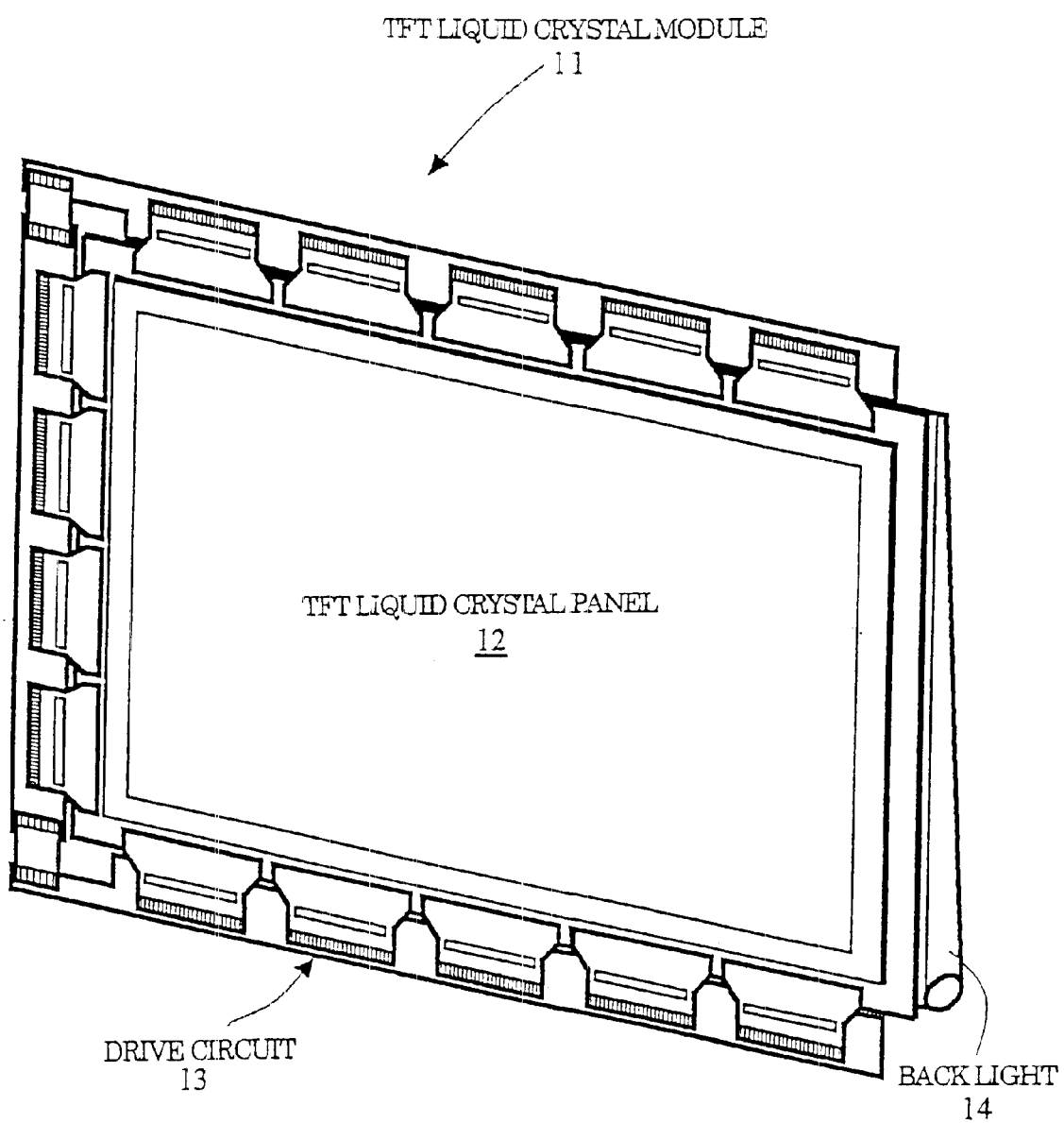
FIG. 1 is a schematic view of a TFT liquid crystal module according to the present invention.

A structure of the TFT liquid crystal module to which the identification mark is formed will be described. FIG. 1 is a figure showing a schematic constitution of a color TFT (Thin-Film Transistor) liquid crystal module according to an embodiment of the present invention. In FIG. 1, reference numeral 11 denotes a color TFT liquid crystal module; 12, a TFT liquid crystal panel having a plurality of pixel regions; 13, a driving circuit comprising a LSI for driving electrically the TFT liquid crystal panel 12 so as to display; and 14, a back light as a light source provided for the TFT liquid crystal panel to display. For example, a cold cathode fluorescent lamp (CCFL) is used as the back light.

Figure 2:
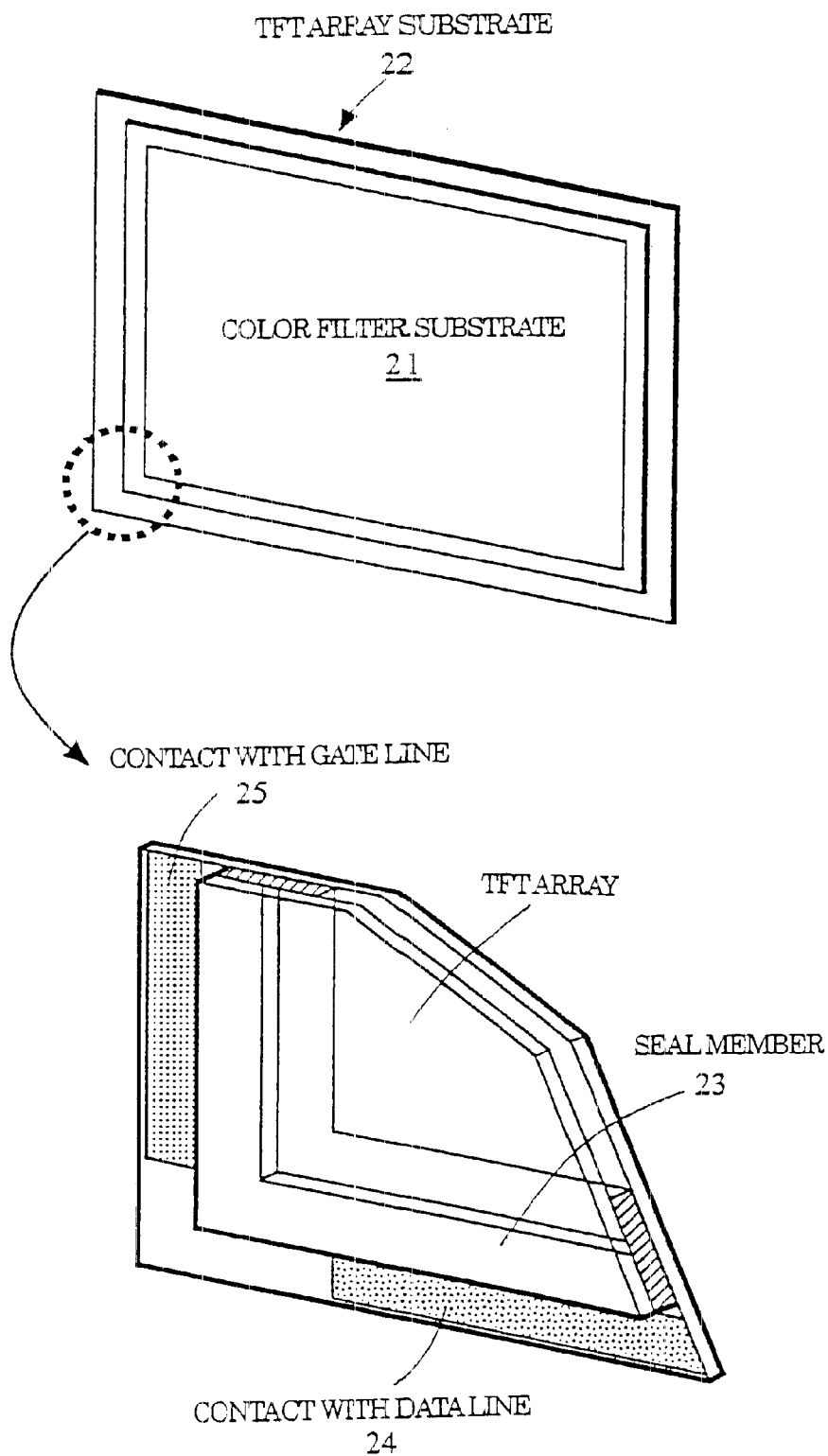
FIG. 2 is a schematic view of a TFT liquid crystal panel according to the present invention.

FIG. 2 shows the TFT liquid crystal panel 12 in the TFT liquid crystal module 11. In FIG. 2, reference numeral 21 denotes a color filter substrate assuming a function of color display, and reference numeral 22 denotes a TFT array substrate comprising a TTF for each pixel region. The TFT array substrate 22 and the color filter substrate 21 are adhered to each other, and a liquid crystal is injected between the TFT array substrate 22 and the color filter substrate 21, and is sealed by a seal member 23. A gap between the TFT array substrate 22 and the color filter substrate 21 is determined by a spacer ball, and the gap therebetween is about 5 μm. Each of the TFT array substrate 22 and the color filter substrate 21 has a display area in which a plurality of pixel regions having the same structure are arranged and a peripheral area around the display area, in which the pixel regions are not arranged. Contacts 24 and 25 for connecting the drive circuit 13 to a data line 37 and a gate line 38 are provided in the peripheral area of the TFT array substrate 22.

Figure 3:
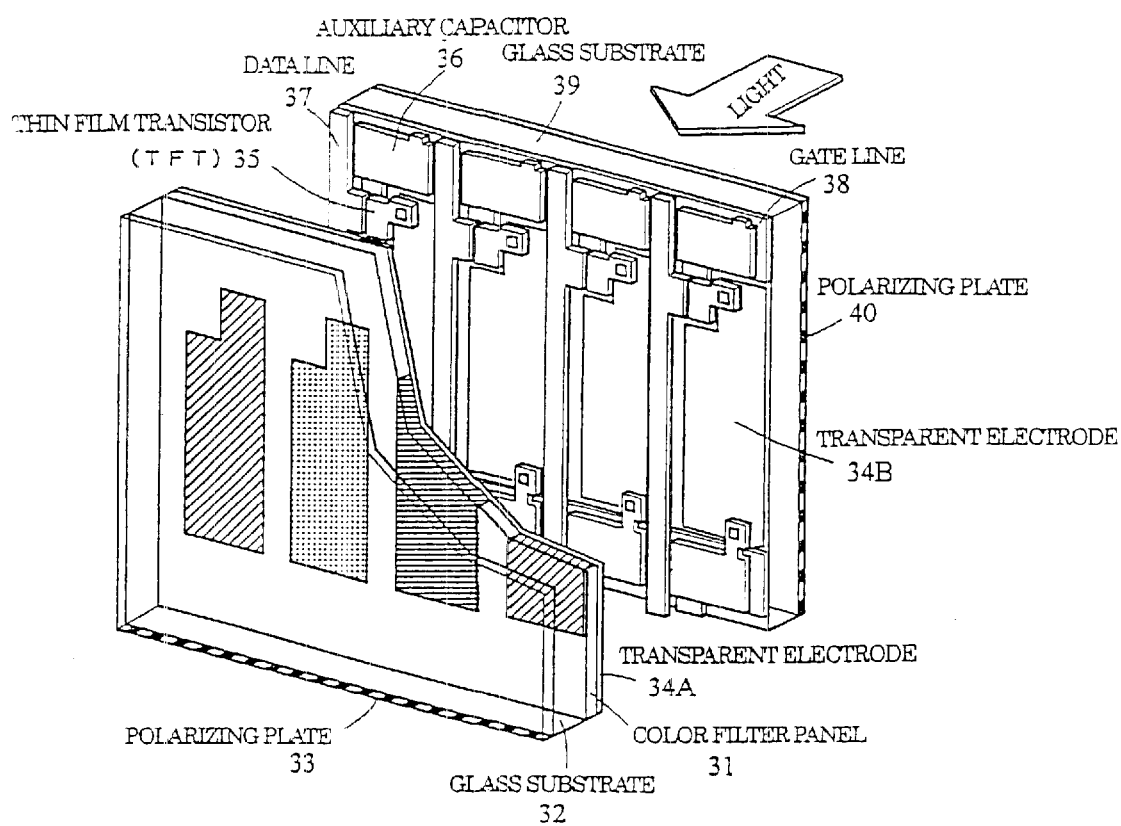
FIG. 3 is a schematic view of a TFT liquid crystal panel according to the present invention.

FIG. 3 shows a part of the display area of the TFT liquid crystal panel 12, which shows an area including four pixel regions in the display area. In FIG. 3, the color filter substrate 21 and the TFT array substrate 22 are described, which constitute the part of the display area. The color filter substrate 21 is composed of a polarizing plate 33 for a polarization of a transmission light, a glass substrate 32, a color filter panel 31 comprising Red, Green and Blue color filters, and a transparent electrode 34A formed of an ITO (Indium Tin Oxide) thin film layer as a display electrode which applies an electric field to the liquid crystal. The transparent electrode 34A is composed of one ITO thin film layer. The TFT array substrate 22 is composed of a plurality of ITO transparent electrodes 34B, a plurality of thin film transistors (TFT) 35 for storing charge in the corresponding ITO transparent electrode 34, a plurality of data lines 37 for controlling a source/drain voltage to each of the corresponding thin film transistors (TFT) 35, which are an aluminum metallic line extending in a longitudinal direction of the TFT array substrate 22, a plurality of gate lines 38 for controlling a gate voltage to each of the corresponding thin film transistors (TFT) 35, which are an aluminum metallic line extending in a lateral direction of the TFT array substrate 22, a plurality of auxiliary capacitors which function as an auxiliary device of the corresponding thin film transistors (TFT) 35, a glass substrate 39, and a polarizing plate 40 for polarizing transmission light. An orientation film for orientating the liquid crystal molecules is provided in each of the transparent electrodes 34A and 34B.

The color filter substrate 21 and the TFT array substrate 22 comprise a plurality of pixel regions, respectively. In each pixel region, one of the R, G and B color filters, the thin film transistor 35, the ITO transparent electrode 34B and the like are formed. Each pixel region is constituted by an opening portion and a black matrix portion. The opening portion is a portion which allows light to transmit therethrough, thus performing a display, and the black matrix portion is a portion through which the light does not transmit. In the color filter substrate 21 in FIG. 3, a light transmission portion composed of the color filter and the ITO transparent electrode 34A correspond to the opening portion. In the TFT array substrate 22, a light transmission portion of the ITO transparent electrode 34B corresponds to the opening portion. Furthermore, in the color filter panel 31, a portion which constitutes a periphery of the color filter and does not allow the light to transmit therethrough is the black matrix portion. In the TFT array substrate 22, a light shield portion composed of the data line 37, the gate line 38, the thin film transistor (TFT) 35 and the like correspond to the black matrix portion. Note that the display area is constituted by arranging the pixel regions continuously.

A display operation of the liquid crystal display device will be briefly described. When an image is displayed in the TFT liquid crystal module, a color image is displayed by controlling a quantity of light which is supplied from the back light 14 and transmits through each of the R, G and B color filters of the color filter substrate 21. The drive circuit 13 controls the charge stored in the transparent electrodes 34 in each pixel region of the TFT array substrate 22, whereby the quantity of the light which is supplied from the back light 14 and transmits through the liquid crystal portion of each pixel region can be controlled.

Figure 4:
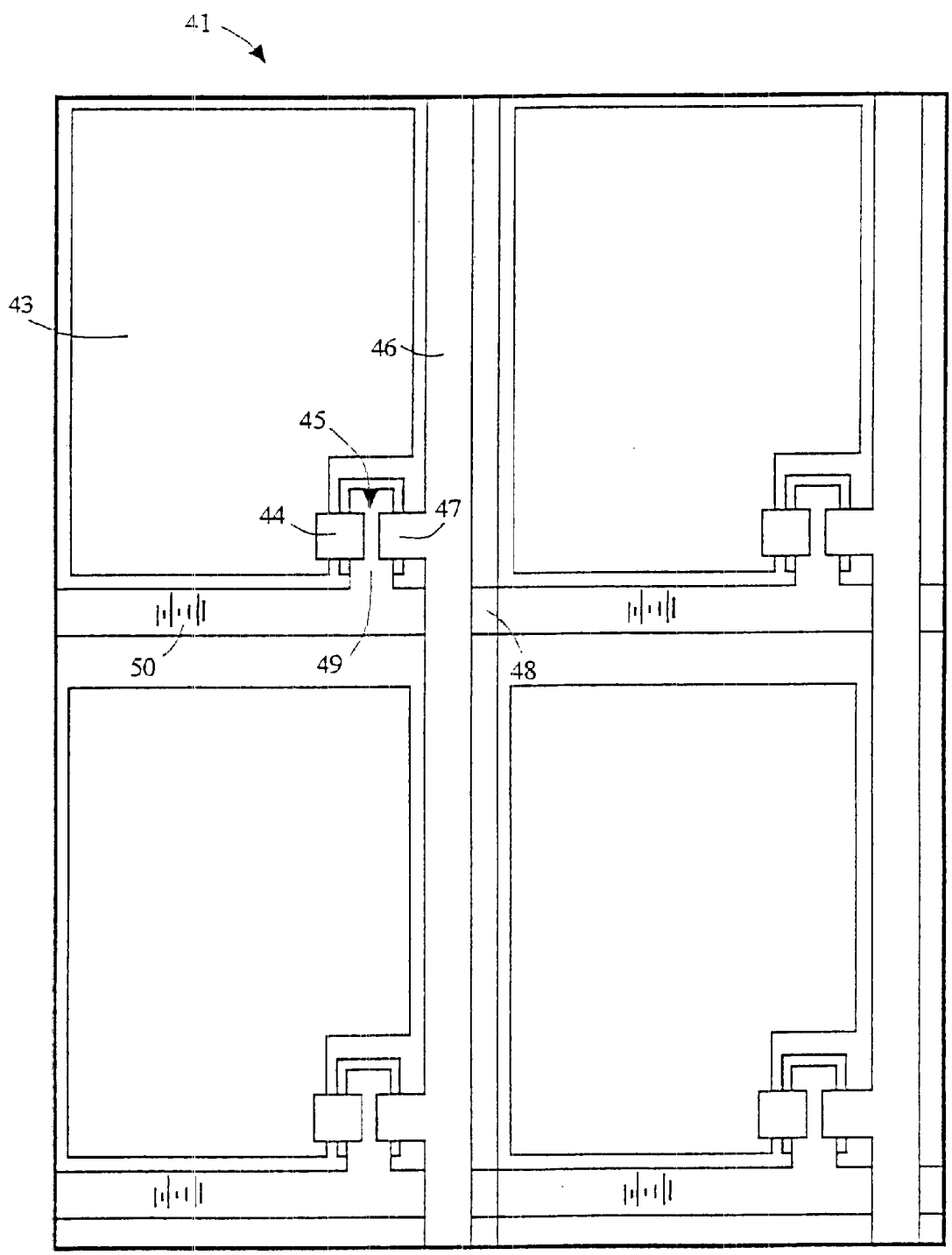
FIG. 4 is a schematic view of a TFT array substrate according to the present invention.

Formation Range of Identification Mark Next, an actual range on the liquid crystal module where the identification mark giving information is to be formed will be described. The range where the identification mark is formed is set freely in accordance with a sense of the information. FIG. 4 shows an example in which the identification mark is provided in each of the pixel regions of the TFT array substrate 22. In FIG. 4, four pixel regions of the TFT array substrate 22 are schematically illustrated. In FIG. 4, in each pixel region 41, the ITO transparent electrode 43, the gate line 48, the gate electrode 49, the data line 46, the drain electrode 47, the source electrode 44, the TFT active device 45 and the identification mark 50 are formed. The gate line 48, the data line 46, the drain electrode 47 and the source electrode 44. are made of an aluminum metal, respectively. The gate electrode is made of molybdenum. The identification mark 50 is formed onto the gate line 48 disposed at the black matrix portion. The identification mark 50 provided by forming a bar code using silver. Note that the auxiliary capacitor 36 in FIG. 3 is omitted.

Figure 5:
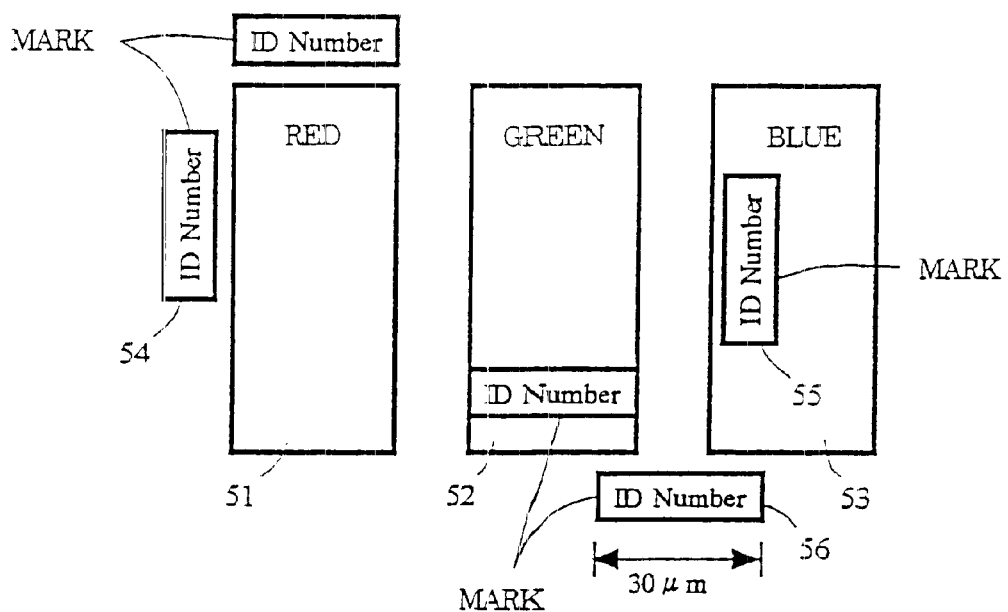
FIG. 5 is a schematic view for explaining a position where an identification mark according to the present invention is formed.

FIG. 5 shows schematically a position where the identification mark is formed. In FIG. 5, portions corresponding to the three pixel regions in which red, green and blue color filters are respectively formed are illustrated. Reference numerals 51 to 53 denote schematically opening portions of the respective pixel regions. The periphery around each opening portion corresponds to the black matrix portion. A mark represented by "ID Number" shows the identification mark in this embodiment. All of the identification marks illustrated in FIG. 5 are not actually formed, but the plurality of identification marks are illustrated to exemplify regions where the identification mark are formed. As illustrated in FIG. 5, as the region where the identification mark is to be formed, the region 55 in the opening portion of the pixel region, the region 54 in the black matrix portion and the region 56 in the black matrix portion, which stretches to be adjacent to two pixel regions are conceived. As a matter of course, the identification mark may be formed in any region, and the region may be changed depending on information given by the identification mark. When the identification mark gives information concerning an address of each pixel region, for example, it might be appropriate that the identification mark is formed in the black matrix portion of each pixel region.

In this embodiment, although the identification mark is formed in the TFT array substrate, the identification mark may be formed in any of the color filter substrate and the TFT array substrate. Moreover, sorts of the identification mark are not limited to one, but plural sorts of identification marks may naturally be formed.

From a viewpoint to maintain a light transmittance in the opening portion, the identification mark should be formed in the black matrix portion. Furthermore, a size of the identification mark should be changed depending on conditions so that the identification mark is not recognized by men viewing the screen. For example, in the case where the identification mark is formed in the screen of an ordinary personal computer, the size of the identification mark must be 30 μm×30 μm or less considering a visual recognition range of men. This is because the identification mark having such size cannot be generally recognized by a human sense of sight.

Shape of Identification Mark

Next, a shape of the identification mark will be described using a concrete example. A first example concerns a way to use a length of a line, a second example concerns a way to use a block, and a third example is a way to use a bar code or a point digitally.

Figure 6:
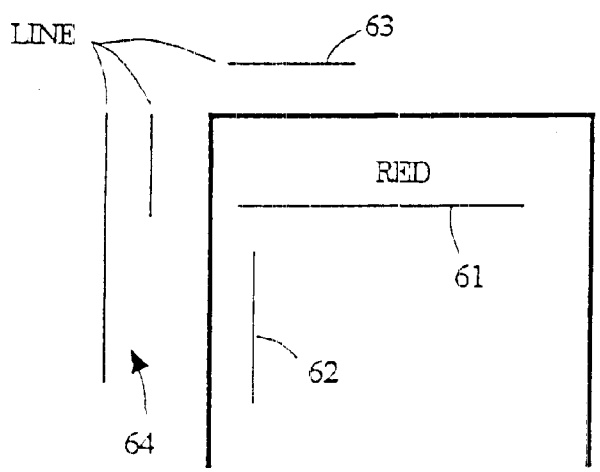
FIG. 6 is a schematic view for explaining a position where an identification mark according to the present invention is formed.

As the first example, a identification mark using the length of the line is shown in FIG. 6. By recognizing the length, an identification mark having a different length from others is made to correspond to specific information having a different content. For example, in the case where each line is related to information concerning a position on the liquid crystal panel, lines having a length out of X (a resolution in the X-axis direction)X Y (a resolution in the Y-axis direction) possible lengths are formed at the corresponding positions, thereby a function as the identification mark can be exerted. Note that only one line is not only used for each identification mark, but also a plurality of lines may be used collectively for each identification mark.

Figure 7:
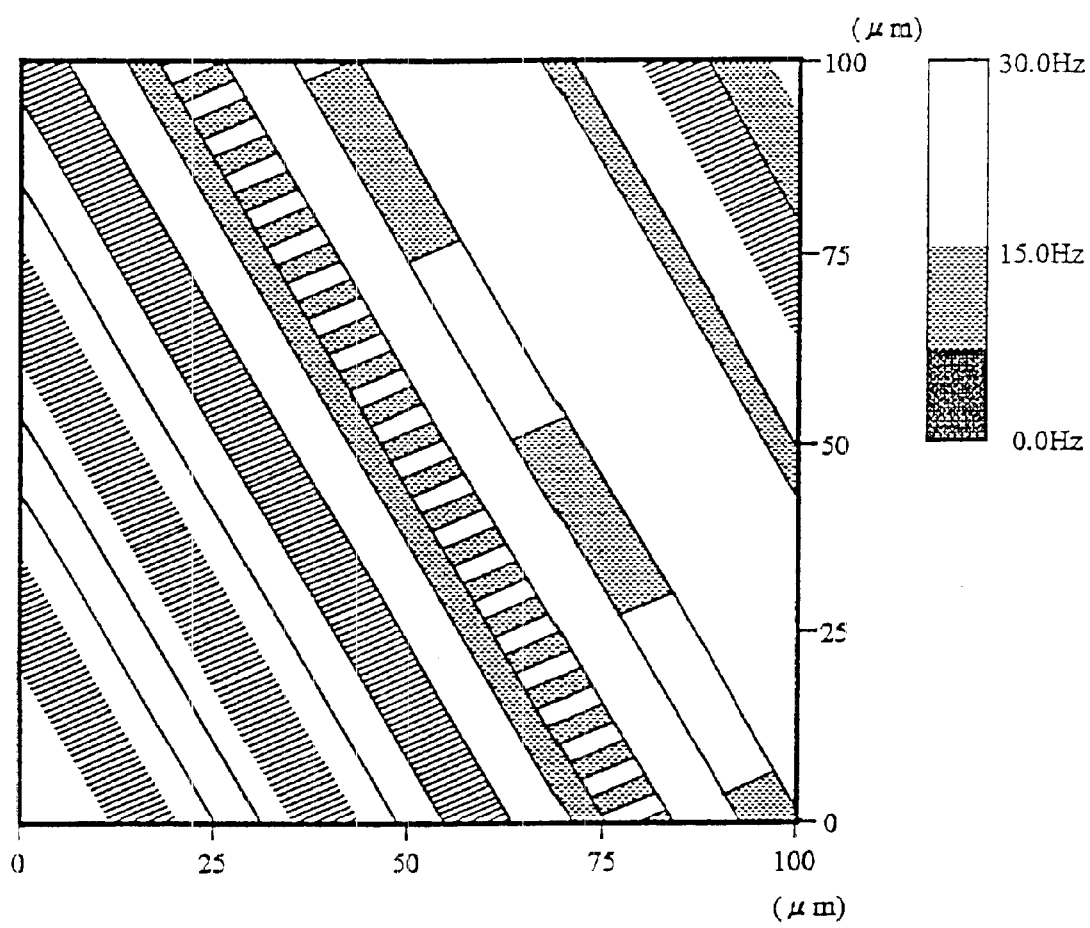
FIG. 7 is a view showing an identification mark using a vertical magnetic property according to the present invention is formed.

As the second example, an example is illustrated in FIG. 7, in which the plurality of identification marks are formed while changing areas of blocks variously. In this example, a metallic material offering a vertical magnetic property is used as a wiring material of the array, the identification marks utilizing magnetism are written in the magnetic layer using a magnetic force microscope, and then the identification marks are read out using the magnetic force microscope, thus enabling men to recognize them in the form of video. In this example, the plurality of identification marks having different block areas (or block lengths) and a width of about 10 μm are shown in a region of 100 μm×100 μm. The lengths of the blocks can be set to various values ranging from the order of sub-micron to the order of several ten micron. Because these identification marks exert their function based on their magnetic property, physical unevenness is not formed in the array wiring material, so that a surface shape of the wiring material does not change.

Figure 8:
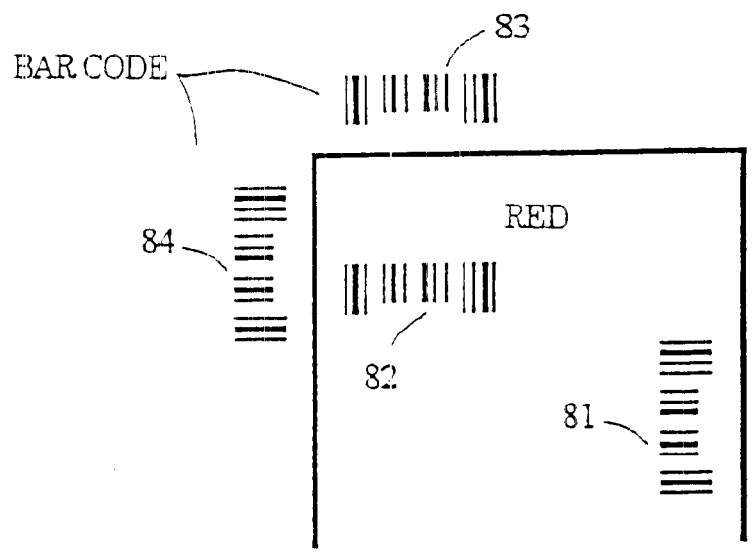
FIG. 8 is a schematic view for explaining a position where an identification mark according to the present invention is formed.
Figure 9:
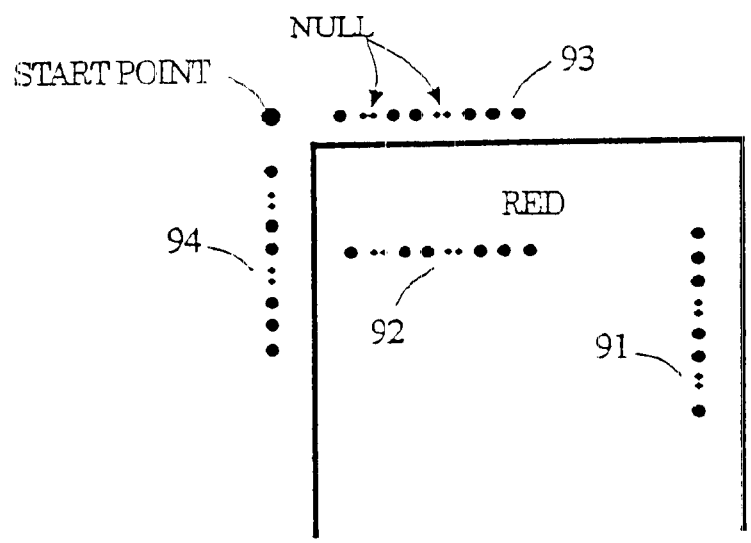
FIG. 9 is a schematic view for explaining a position where an identification mark according to the present invention is formed.

As the third example, a way to use a bar code as the identification mark is shown in FIG. 8. The bar code is a widely known technology, and a description for it is omitted. Note that by using a standard specification, the bar code can be easily decoded while detecting information. Furthermore, a way to use points digitally is shown in FIG. 9. By relating the presence or absence of a point to digital signals "ON(1)" and "OFF(0)" respectively, it is possible to allow the identification mark to correspond to respective information. According to this way, the forming of identification mark can be simplified, and the detection for them can be performed easily.

Note that in order to detect the identification marks easily, it is inevitable to write a symbol functioning as a starting point in the foregoing identification marks previously. In FIG. 9, a point larger than other points is used as the starting point.

Formation Method of Identification Mark

Next, a method to form the identification mark will be described. Although identification marks having various shapes can be conceived as described above, two methods are basically conceived as the formation method. One is a method to form the identification mark by providing physical unevenness or a hole, and the other is a method to form the identification mark using a substance different from a material around the identification mark.

In any of those two methods, the identification mark can be formed by using technologies used in manufacturing steps of the liquid crystal module or the semiconductor device. The identification mark can be formed by thin film deposition technologies using various kinds of PVD (Physical Vapor Deposition) methods or CVD (Chemical Vapor Deposition) methods and various kinds of etching technologies. The metallic thin films such as a data line, a gate line and an ITO transparent electrode are generally formed by sputtering, and an active semiconductor layer and a gate insulating layer are formed by the CVD method. Accordingly, the identification mark can be formed using these technologies. Usage of a photo CVD method and a laser etching method using a laser beam can be also conceived for forming the identification mark. When a substance different from that around the identification mark is used as a material of the identification mark, an ion-implantation method can be used, for example, to form the identification mark by implanting ions into a thin film.

Note that a formation method of the identification mark is selected, which meets the requirements for the detection of the identification mark. As the foregoing organic substances, the photoresist used in the manufacturing steps of the TFT array can be left in the shape of the identification mark. Thus, a processing for depositing newly a thin film can be omitted. In the case where a metal, which is different from those of the gate line, the data line and the like, is used for the formation of the identification mark, for example, gold and silver can be used. Furthermore, as described in FIG. 7, in the case where the identification mark is formed using the metallic material offering the vertical magnetic property, although the identification mark has no unevenness and the material of the periphery of the identification mark is the same as that of the identification mark, the identification mark can be formed by changing the physical property that is a magnetic direction. Note that the method to form the identification mark using the metallic material offering the vertical magnetic property is described concerning FIG. 7.

Detection of Identification Mark

A method to detect the identification mark will be described. The identification mark giving information generally exists in such manner that its shape or substance differs from that of the periphery thereof. Alternatively, the identification mark generally inheres in a material in a state of offering a different physical property, such as the magnetic information from others. When the identification marks have different shapes from each other, since a focal length of light differs depending on the shape, the recognition of the identification mark can be performed by irradiating, for example, a laser beam and measuring the focal length of the laser beam. Moreover, when a material of the specific identification mark differs from those of other identification marks, a reflectance differs depending on the material. Utilizing this characteristic, a laser beam is irradiated onto the identification mark and a reflectance of the material is measured, whereby the identification mark can be recognized. Particularly, when the material of the identification mark is a magnetic substance, it is possible to detect the identification mark by utilizing a magnetic effect and a photoelectro-magnetic effect. A medium used for the detection of the identification mark is not limited to the laser beam, but ordinary light can be used. Moreover, usage of lights such as visible light, infrared ray and the like, which have different wavelengths, may be conceived depending on the size of the identification mark.

Repair Process of TFT Array

Figure 10:
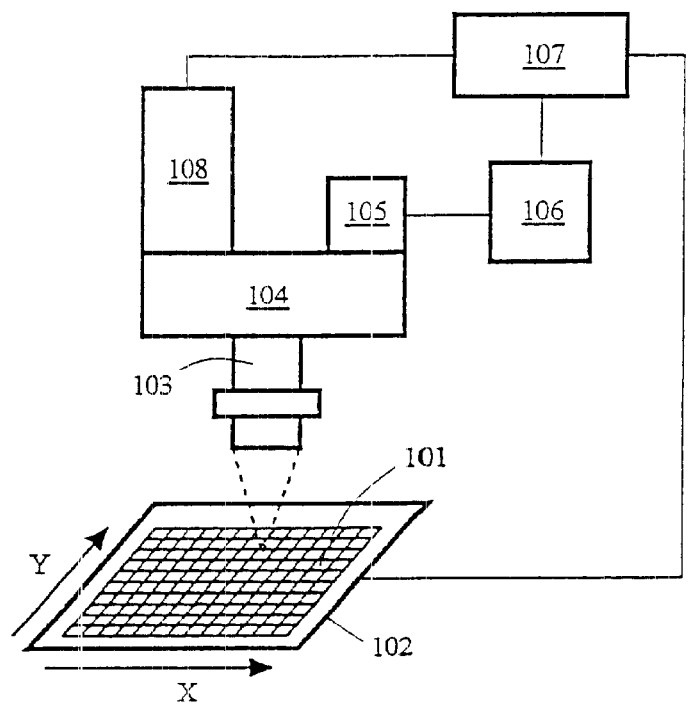
FIG. 10 is a schematic view of a repair apparatus for the TFT array substrate according to the present invention.

A repair process of the TFT array will be described with reference to FIGS. 4 and 10. FIG. 10 is an explanatory view showing a repair system of the TFT array in this embodiment. In this embodiment, a repair processing will be described, in which a transistor as an active device being malfunctioning in the TFT array is fused by a laser beam to keep the transistor at a short-circuited state. A logic address of the malfunctioning transistor on the TFT array is known by an electrical measurement in a step prior to the repair processing. In this electrical measurement, all of the transistors on the TFT array are driven. If any of the transistors is malfunctioning, the malfunctioning transistor is detected, and its logic address is output. In this embodiment, as shown in FIG. 4, an identification mark 50 is provided on a gate line 48 in each pixel region on the TFT array. Since the identification mark 50 has address information concerning the transistor 45 in the corresponding pixel region, a final instructed spot to be repaired can be obtained by processing an image taken in through an optical microscope and a CCD camera.

In FIG. 10, reference numeral 101 denotes a TFT array, in which an identification mark is provided; 102, an X-Y stage for mounting the TFT array 101 thereon to move a position of the TFT array 101; 103, an optical microscope; 104, a beam splitter; 105, a CCD camera which serves as identification mark reading-out means; 106, an image processing apparatus which serves as position decision means for deciding an address of a malfunctioning transistor; 107, a laser beam output apparatus; and 108, a controller for controlling the X-Y stage 102, the laser beam output apparatus 107 and the like.

An operation of the repair system of the TFT array will be described. In FIG. 10, the TFT array is fastened on the X-Y stage 102. The logic address of a transistor that is a malfunctioning spot is registered in the image processing apparatus 106, previously. The image processing apparatus 106 sends a signal to the controller 108 so that a focal point of the optical microscope 103 becomes close to the malfunctioning transistor. The controller 108 sends a signal to the X-Y stage 102 to control the X-Y stage 102. Thus, the X-Y stage 102 is moved. A video of the neighborhood of the malfunctioning spot is transmitted from the optical microscope 103 to the CCD camera 105 through the beam splitter 104, and recognized by the CCD camera 105. Thereafter, the video is transmitted to the image processing apparatus 106. From the identification mark 50 obtained in the video, the image processing apparatus 106 specifies the address information of the identification mark 50 photographed by the optical microscope 103. The image processing apparatus 106 decides whether or not the specified address coincides with the logic address of the malfunctioning spot registered.

If the logic address and the address information of the identification mark 50 are coincident with each other, the image processing apparatus 106 sends a signal to the controller 108 so that a position to be irradiated by a laser beam matches with a focal point of the laser beam. At this time, an offset distance from the position where the identification mark 50 is provided to the position to be irradiated by the laser beam is previously input to the image processing apparatus 106. In FIG. 4, the distance from the identification mark 50 to the TFT 45 corresponds to the offset distance. The controller 108 allows the X-Y stage 102 to move based on the signal from the image processing apparatus 106. After the X-Y stage 102 moves to a position at which oscillation of the laser is permitted, a signal is sent from the controller 108 to the laser beam output apparatus 107, and the laser beam output apparatus 107 which received the signal emits the laser beam onto the TFT array 101.

If the address information of the identification mark 50 and the logic address of the malfunctioning spot are not coincident with each other, the image processing apparatus 106 decides the difference between the address obtained by the video and the logic address to be objected. Based on the decision result, the image processing apparatus 106 sends a signal to the controller 108 so that the X-Y stage 102 moves to a position where an identification mark having the address information corresponding to the logic address to be objected is taken in a video. The controller 108 which received the signal allows the X-Y stage 102 to move to that position, based on the signal. The image processing apparatus 106 sends a signal to the controller 108 so that the TFT 45 moves to a focal position of the laser. Based on the signal from the image processing apparatus 106, the controller 108 moves the X-Y stage 102. After the X-Y stage 102 moves to a position where the laser is permitted to oscillate, a signal is sent from the controller 108 to the laser beam output apparatus 107, and the laser beam output apparatus 107 which received the signal emits the laser beam to the TFT 45.

The identification of the malfunctioning transistor has been performed by specifying the logic address by means of an electrical measurement. However, even when the logic address of the malfunctioning transistor is known, physical address information does not exist. Accordingly, it has been very difficult to finally identify which transistor is actually malfunctioning. The malfunctioning transistor could be easily decided from the video by the microscope only when the transistor had remarkable planar structural abnormalities. When a fine defect exists within the transistor, it has been impossible to decide the malfunctioning transistor only by the video. According to this embodiment, since the identification mark is provided in the pixel region, a transistor to be repaired can be certainly identified. Moreover, as described above, since the identification mark having the address information is provided in the TFT array, labor required for the conventional way to detect a repair position can be significantly reduced, and a precision of the position detection can be increased.

Next, a style for utilizing the identification mark in an information processing apparatus will be described, in which figures/characters are drawn/input on a screen using a laser pen and decision buttons such as "Yes", "No", "Next Screen" and "Previous Screen" are selected from a screen using the laser pen. In the case where figures/characters are drawn/input from the screen using a laser pen, an identification mark having address information is provided for each pixel region that is the minimum range controllable in the liquid crystal panel, whereby the locus can be precisely detected.

Figure 11:
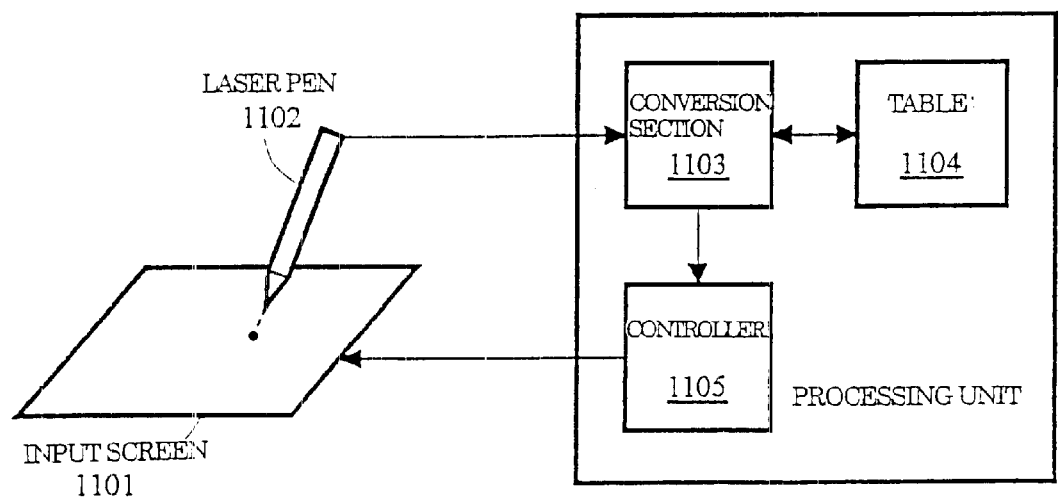
FIG. 11 is a schematic view of a screen input apparatus according to the present invention.
Figure 12:
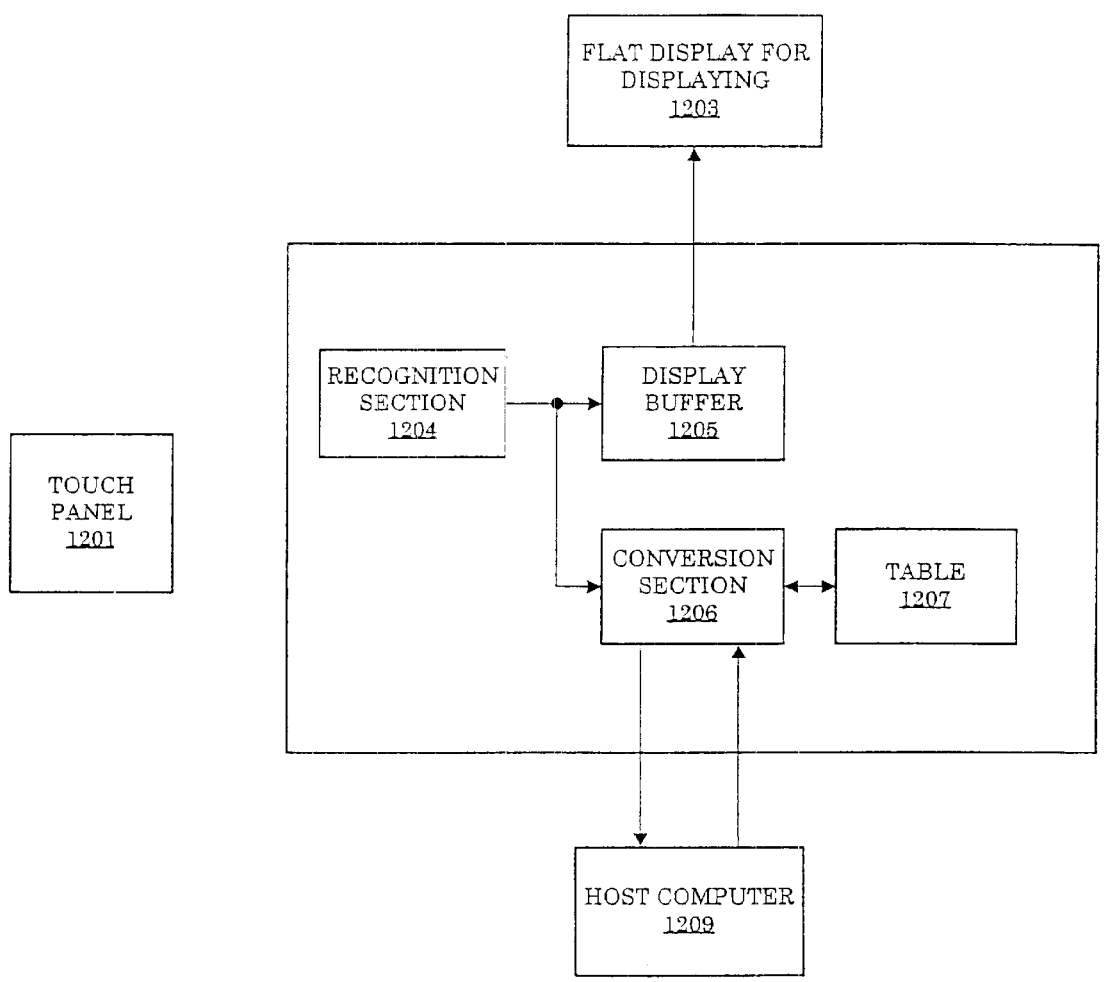
FIG. 12 is a schematic view of a screen input apparatus in the prior art.

FIG. 11 shows schematically an example of information processing apparatuses for entering figures and characters from the screen using the laser pen. In FIG. 11, reference numeral 1101 denotes an input screen, and reference numeral 1102 denotes a laser pen. For example, by tracing a figure on the screen 1101 with the laser pen 1102, the laser pen 1102 detects the identification mark formed in the pixel region which traced. The laser pen 1102 transmits the detected identification mark to a conversion section 1103. The identification mark and the address of the pixel region are registered in the table 1104 so as to correspond to each other. The conversion section 1103 refers to the table 1104, and specifies the position of the pixel region from the identification mark and transmits it to the controller 1105. The controller 1105 allows the pixel at the specified position to be displayed.

As described above, by specifying the position of the pixel region from the detected identification mark, the information processing apparatus can define the locus of the laser pen precisely, and hence the information processing apparatus can minutely recognize the figures and the characters input. Or, since the information processing apparatus specifies the position of the pixel region from the identification mark detected by the laser pen and allows the pixel region of the position to be displayed, the characters and the figures input can be displayed precisely and minutely. On the other hand, when the decision buttons such as "Yes" and "No" are selected by the laser pen, it is unnecessary to perform the precise range setting. Accordingly, it suffices that a range composed of several pixels is set as a segment and a position of the segment is specified.

In this embodiment, although the method in which the identification mark formed in the vicinity of the transistor on the TFT array is directly defined by the optical microscope was described, it is also possible to utilize the identification mark formed in the display area by projecting it on a screen. Thus, the detection of the position and the indication of the position on the large screen can be facilitated.

The information possessed by the identification mark is not limited to the one concerning the position and the address. The information of the identification mark can be transformed in accordance with its use, for example, to color information of color filters in the pixel on which the identification mark is formed. Moreover, the description for the color TFT liquid crystal module was made in this embodiment. However, other kinds of display apparatus such as a Cathode-Ray Tube (CRT), a plasma display, a reflection-type liquid crystal display and a Twisted Nematic (TN) liquid crystal display can be adopted similarly to the color TFT liquid crystal module for the usage in this embodiment by forming the identification mark in the pixel according to this embodiment.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A display device comprising:
   a plurality of pixel regions formed therein,
   each of said pixel regions has an identification mark giving specific information thereof, and
   wherein said identification mark gives information concerning a position of said pixel region of said liquid crystal display panel.

2. A liquid crystal display panel which comprises a first glass substrate, a second glass substrate, a liquid crystal sealed between said first and second glass substrates, and a display electrode for applying an electric field to said liquid crystal, comprising:
   a plurality of pixel regions, each having an identification mark giving specific information,
   wherein said identification mark gives information concerning a position of said pixel region of said liquid crystal display panel.

3. A liquid crystal display panel which comprises a first glass substrate, a second glass substrate, a liquid crystal sealed between said first and second glass substrates, and a display electrode for applying an electric field to said liquid crystal, comprising:
   a plurality of pixel regions, at least one of the pixel regions containing an identification mark giving information,
   wherein each of said pixel regions is composed of an opening portion which allows light to pass therethrough and a light-shield portion other than said opening portion, and said identification mark is formed in said light-shield portion.

4. The liquid crystal display panel according to claim 3, wherein a thin film transistor, a data line and a gate line are formed in said light-shield portion, and said identification mark is formed in one of said data line and said gate line.

5. A liquid crystal display panel which comprises a first glass substrate, a second glass substrate, a liquid crystal sealed between said first and second glass substrates, and a display electrode for applying an electric field to said liquid crystal, comprising:
   a plurality of pixel regions, at least one of the pixel regions containing an identification mark giving information,
   wherein said identification mark has a size in which the longest side is about 30 $\mu$m or less.

6. A liquid crystal display panel which comprises a first glass substrate, a second glass substrate, a liquid crystal sealed between said first and second glass substrates, and a display electrode for applying an electric field to said liquid crystal, comprising:
   a plurality of pixel regions, each having an identification mark giving specific information,
   wherein said identification mark has a size in which the longest side is about 30 $\mu$m or less.

7. A display device comprising:
   a plurality of pixel regions formed therein,
   wherein at least one of said pixel regions having an identification mark giving information,
   wherein said identification mark has a size in which the longest side is about 30 $\mu$m or less.

8. An identification mark detection device which detects an identification mark provided in a display device having a plurality of pixel regions, comprising:
   said plurality of pixel regions including an identification marked formed in at least one of said pixel regions giving specific information regarding the position of the pixel region in said display device;
   identification mark reading-out means for reading out an identification mark formed in at least one of said pixel regions; and
   position decision means for, after said identification mark reading-out means reads out an identification mark, specifying a position of said pixel region in said display device based on the identification mark read out by said identification mark reading-out means.

9. A detection display system, comprising:
   a display device having a plurality of pixel regions formed therein;
   an identification mark detection device detecting an identification mark provided in said display device,
   wherein said identification mark detection device comprises, identification mark reading-out means for reading out an identification mark formed in at least one of said pixel regions; and position decision means for, after said identification mark reading-out means reads out an identification mark, specifying a position of said pixel region in said display device based on the identification mark read out by said identification mark reading-out means, and wherein said display device displays a pixel region at the position specified by said position decision means, after said position decision means specifies a position of said pixel region.

10. An identification mark detection method which detects an identification mark provided in a display device having a plurality of pixel regions formed therein, the method comprising:

an identification mark reading-out step for reading out an identification mark formed in at least one of said pixel regions; and a position specifying step for, after said identification mark reading-out step reads out an identification mark, specifying a position of said pixel region based on the identification mark read out in said identification mark read-out step.

11. The identification mark detection method according to claim 10, said identification mark detection method further comprising:

a pixel region displaying step for, after said position specifying step specifies a position of said pixel region, displaying the pixel region at the position specified in the position specifying step.

\* \* \* \* \*